(12) United States Patent
Gill et al.

(10) Patent No.: US 10,230,454 B2
(45) Date of Patent: Mar. 12, 2019

(54) CLOUD MASK DATA ACQUISITION AND DISTRIBUTION USING GEOSYNCHRONOUS COMMUNICATIONS OR BROADCAST SATELLITES

(71) Applicant: Space Systems/Loral, LLC, Palo Alto, CA (US)

(72) Inventors: Jared Kauffman Gill, San Francisco, CA (US); Saghir Munir, San Ramon, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 82 days.

(21) Appl. No.: 15/247,052

(22) Filed: Aug. 25, 2016

(65) Prior Publication Data

US 2018/0062735 A1 Mar. 1, 2018

(51) Int. Cl.
*H04B 7/185* (2006.01)
(52) U.S. Cl.
CPC ..... *H04B 7/18523* (2013.01); *H04B 7/18519* (2013.01)
(58) Field of Classification Search
CPC .................. H04B 7/18523; H04W 72/042
USPC ........................................................ 370/329
See application file for complete search history.

(56) References Cited

U.S. PATENT DOCUMENTS

| 5,646,630 | A | * | 7/1997 | Sheynblat | G01S 19/07 |
| | | | | | 342/357.31 |
| 6,331,870 | B1 | | 12/2001 | LeCompte | |
| 7,905,453 | B2 | | 3/2011 | Benedict et al. | |
| 9,497,380 | B1 | * | 11/2016 | Jannard | H04N 5/247 |
| 9,740,465 | B1 | * | 8/2017 | Coleman | G06F 8/60 |
| 9,843,388 | B1 | * | 12/2017 | Astakhov | H04B 10/118 |
| 2002/0041328 | A1 | | 4/2002 | LeCompte et al. | |
| 2004/0021770 | A1 | | 2/2004 | Krill | |
| 2010/0208076 | A1 | * | 8/2010 | Kinoshita | G06K 9/00791 |
| | | | | | 348/148 |
| 2012/0020280 | A1 | | 1/2012 | Jansson et al. | |
| 2012/0184208 | A1 | * | 7/2012 | Renouard | H04B 7/18521 |
| | | | | | 455/12.1 |
| 2012/0239295 | A1 | | 9/2012 | Kamel et al. | |

(Continued)

OTHER PUBLICATIONS

Janschek et al., "Design concept for a secondary payload Earth observation camera," Dresden University of Technology, Department of Electrical Engineering, 01062 Dresden, Germany, Ufa State Aviation Technical University, K.Marx str.12, 450025 Ufa, Russia, Part of the EUROPTO Conference on Sensors, Systems, and Next-Generation Satellites V 78 Florence, Italy • Sep. 1999 SPIE vol. 3870 • 0277-786X/99, 78-86.

*Primary Examiner* — Peter G Solinsky
(74) *Attorney, Agent, or Firm* — Weaver Austin Villeneuve & Sampson LLP

(57) ABSTRACT

Cloud mask image data is obtained by a secondary imaging payload disposed on a communications or broadcast satellite operating in geosynchronous orbit. The obtained cloud mask image data is provisioned for use, in near real time, by one or more low earth orbit imaging satellite systems. Provisioning the obtained cloud mask image data may include collecting the data on the ground and making it available to one or more operators of the one or more LEO imaging satellite systems and/or transmitting the data from the communications or broadcast satellite to at least one spacecraft in the one or more LEO imaging satellite systems.

18 Claims, 7 Drawing Sheets

(56) References Cited

U.S. PATENT DOCUMENTS

| | | | |
|---|---|---|---|
| 2015/0019185 A1 | 1/2015 | Cunningham et al. | |
| 2015/0318916 A1* | 11/2015 | Gopal | H04B 7/18519 455/13.1 |
| 2016/0169658 A1* | 6/2016 | Seel | G01B 11/00 250/340 |
| 2017/0041472 A1* | 2/2017 | Steadman | H04N 7/181 |
| 2017/0195040 A1* | 7/2017 | Sobhani | H04B 7/18521 |
| 2017/0250751 A1* | 8/2017 | Kargieman | H04B 7/18513 |
| 2017/0302377 A1* | 10/2017 | Boroson | H04B 10/118 |

* cited by examiner

CLOUD MASK DATA ACQUISITION AND DISTRIBUTION USING GEOSYNCHRONOUS COMMUNICATIONS OR BROADCAST SATELLITES

TECHNICAL FIELD

This disclosure relates generally to provision of cloud mask data for use by a Low Earth Operating (LEO) spacecraft system, and more particularly to obtaining cloud mask image data from a secondary imaging payload disposed on a communications or broadcast satellite operating in geosynchronous orbit and forwarding the data to one or more LEO imaging satellite systems.

BACKGROUND

About two-thirds of the Earth's surface is covered by clouds at any given time. An increasing number of LEO spacecraft systems are intended to obtain imagery data of features on the ground that may be obscured by such clouds. In the absence of real-time knowledge of cloud location, LEO system resources may be wasted as a result of collecting and processing image data that are unusable as a result of cloud obscuration. Knowledge of where clouds are in real or near real time would mitigate this problem. Low latency is important, because cloud coverage can drastically change in a timeframe of a few minutes (cloud speed 30-100 mph). Referring now to FIG. 7, a comparison of Detail A and Detail B, images obtained one hour apart, demonstrates how significantly cloud coverage patterns change in the space of one hour.

The assignee of the present invention manufactures and deploys spacecraft that provide communications and broadcast services, many of which operate from geosynchronous orbits (GEO), that is, circular, near-equatorial orbits having a radius of 42,164 kilometers. The Geo orbit has an orbital period of one sidereal day, thus a satellite in GEO (a "GEO spacecraft") appears nearly stationary to a ground station on the earth, which is advantageous for many communications and broadcast mission. GEO spacecraft, as the term is used herein and in the claims, include spacecraft disposed in geosynchronous orbits having an inclination as high as 15 degrees. Communications or broadcast satellites, as the term is used herein and in the claims, include only spacecraft having a primary radiofrequency (RF) payload drawing 10 kW or more.

A satellite in GEO can persistently obtain image data of a substantial fraction of the Earth's surface. Although some current GEO satellites include a primary payload configured to obtain image data for weather forecasting purposes, for example, ground processing of the image data can take several hours. Moreover, the cost to deploy a GEO satellite having an imaging system suitable for weather forecasting as a primary payload satellite is extremely high. Thus, such systems tend to be developed as national/regional assets, e.g., the US Geostationary Operational Environmental Satellite (GOES) system, the Japanese Geostationary Meteorological Satellite (GMS) system, and Multifunctional Transport Satellites (MTSAT), and the European Meteosat program.

SUMMARY

The present inventors have appreciated that a commercial communications or broadcast satellite located in GEO can be used as a platform from which cloud mask data may be acquired and distributed with very low latency to LEO spacecraft system resources that may be distributed over a broad geographic area.

According to some implementations, a method includes obtaining cloud mask image data from a secondary imaging payload disposed on a communications or broadcast satellite operating in a geosynchronous orbit and provisioning the obtained cloud mask image data such that the obtained cloud mask image data is available in near real time to one or more low earth orbit (LEO) imaging satellite systems. In some examples, provisioning the obtained cloud mask image data may include collecting the data on the ground and making it available to one or more operators of the one or more LEO imaging satellite systems.

In some examples, provisioning the obtained cloud mask image data may include transmitting the data from the communications or broadcast satellite to at least one spacecraft in the one or more LEO imaging satellite systems. In some examples, transmitting the data from the communications or broadcast satellite to the at least one spacecraft may include using an inter-satellite link. In some examples, provisioning the obtained cloud mask image data may include transmitting the data from the communications or broadcast satellite to a gateway. In some examples, transmitting the data from the communications or broadcast satellite to the gateway may include overlaying the data onto an existing telemetry downlink.

In some examples, the secondary imaging payload may be a steerable camera. In some examples, the steerable camera may include a charge coupled device image sensor.

In some examples, the communications or broadcast satellite may have a dry mass and a rated power, and the secondary imaging payload comprises less than 5% of the dry mass, and less than 5% of the rated power.

In some examples, the communications or broadcast satellite may be disposed in a geostationary orbit.

According to some implementations, a satellite configured for operation in geosynchronous orbit includes a primary payload subsystem directed toward one or both of communications and broadcast services, a power subsystem configured to provide 10 KW or more of DC power to the primary payload subsystem and a secondary imaging payload configured to obtain cloud mask image data. The satellite is configured to forward the obtained cloud mask image data in near real time to one or more low earth orbit imaging (LEO) imaging satellite systems.

In some examples, the satellite may be configured to forward the obtained cloud mask image data by transmitting the data to at least one spacecraft in a LEO imaging satellite system.

In some examples, the satellite may be configured to forward the obtained cloud mask image data by transmitting the data to a gateway. In some examples, transmitting the data to the gateway includes overlaying the data onto an existing telemetry downlink.

In some examples, the secondary imaging payload may be a steerable camera. In some examples, the steerable camera may include a charge coupled device image sensor.

In some examples, the satellite may have a dry mass and a rated power, and the secondary imaging payload comprises less than 5% of the dry mass, and less than 5% of the rated power.

In some examples, the satellite may be disposed in a geostationary orbit.

According to some implementations, a system includes gateway and a satellite, the satellite being configured for operation in geosynchronous orbit and including a primary payload subsystem directed toward one or both of communications and broadcast services, a power subsystem configured to provide 10 KW or more of DC power to the primary payload subsystem, and a secondary imaging payload configured to obtain cloud mask image data. The satellite is configured to forward the obtained cloud mask image data in near real time to one or more low earth orbit imaging (LEO) imaging satellite systems by transmitting the data to the gateway.

In some examples, transmitting the data to the gateway may include overlaying the data onto an existing telemetry downlink.

BRIEF DESCRIPTION OF THE DRAWINGS

Features of the invention are more fully disclosed in the following detailed description of the preferred embodiments, reference being had to the accompanying drawings, in which like reference numerals designate like structural element, and in which.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it can be directly connected or coupled to the other element, or intervening elements may be present. It will be understood that although the terms "first" and "second" are used herein to describe various elements, these elements should not be limited by these terms. These terms are used only to distinguish one element from another element. As used herein, the term "and/or" includes any and all combinations of one or more of the associated listed items. The symbol "/" is also used as a shorthand notation for "and/or".

The present inventors have appreciated that a communications or broadcast satellite located in GEO can be used as a platform from which cloud location ("cloud mask") data may be obtained and disseminated with very low latency (i.e., in near real time) to LEO spacecraft system resources that may be distributed over a broad geographic area. This invention improves the efficiency of an Earth imaging LEO spacecraft system by providing, in near real time (e.g. within a few seconds or minutes of image acquisition), cloud mask data obtained by an imaging sensor (camera) disposed, as a secondary payload, on the commercial GEO satellite. The camera may be tailored for obtaining cloud mask data useful for look ahead tasking of LEO imaging satellite assets.

Figure 1:
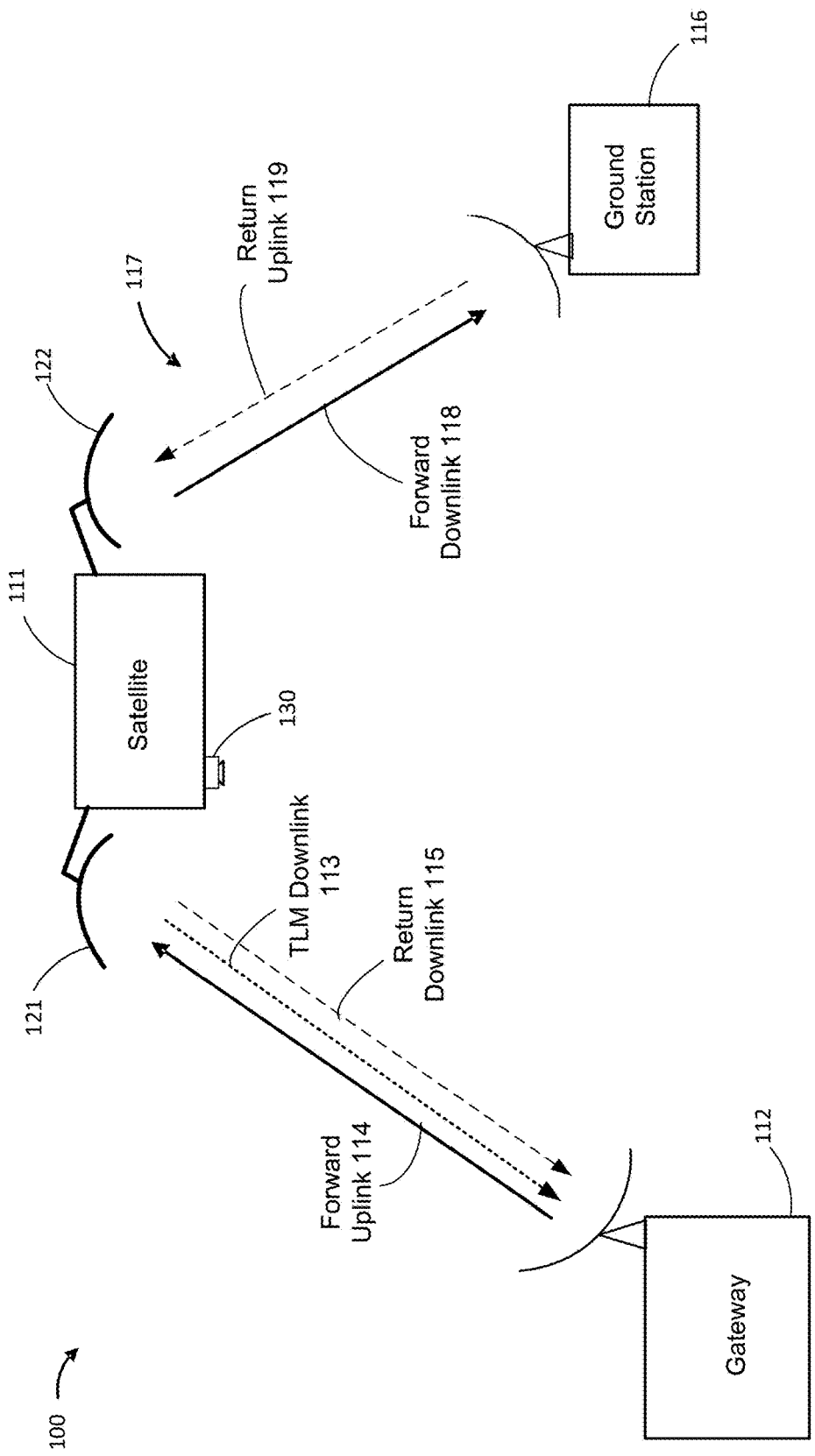
FIG. 1 illustrates a simplified diagram of a satellite system, in accordance with an implementation.

FIG. 1 illustrates a simplified diagram of a satellite system 100, in accordance with an implementation. The system includes a communications or broadcast satellite 111 located in a geosynchronous orbit. The satellite 111 may be communicatively coupled, via at least one antenna 121, by a forward uplink 114 and a return downlink 115 to a gateway 112. The satellite 111 may also be communicatively coupled via at least one antenna 122, by a forward downlink 118 and a return uplink 119, to a ground station (or user terminal) 116. Although for clarity of illustration, only a single gateway 112 and a single ground station 116, is depicted in FIG. 1, it will be appreciated that satellite 111 may ordinarily be communicatively coupled simultaneously with a substantial number of gateways 112 and ground stations 116. The system may provide point to point voice and/or data communications services and/or point to multi point broadcast services. Accordingly, the satellite 111 may be referred to as a communications or broadcast satellite. The forward uplink 114, return downlink 115, forward downlink 118 and return uplink 119 may operate at one or more microwave bands, including, for example L-band, S-band, C-band, X-band, Ku-band, Ka-band, Q-band and V-band. Satellite 111 will ordinarily include a primary payload directed toward one or both of communications and broadcast services, for example a payload subsystem that processes signals traveling between gateways 112 and ground stations 116. A typical communications or broadcast satellite of the type contemplated by the present invention may include a power subsystem configured to provide 10 KW or more of DC power to the satellite's payload subsystem.

In the illustrated implementation, the satellite 111 includes a secondary imaging payload 130. The secondary imaging payload 130 may be configured to obtain image data of the Earth. The image data may relate to a portion of or all the Earth's disk viewable from the satellite 111 and may be or include cloud mask image data. The image data may include visual and/or infrared (IR) spectrum data.

The satellite 111 may be configured to forward obtained cloud mask image data in near real time to one or more low earth orbit imaging satellite systems. For example, the satellite 111 may be configured to forward the cloud mask image data over the return downlink 115 to the gateway 112. The gateway 112 may be communicatively coupled with the one or more low earth orbit imaging satellite systems (not illustrated). In an implementation, the satellite 111 may be configured to forward the cloud mask image data over telemetry (TLM) downlink 113 to the gateway 112. As a further example, the satellite 111 may be configured to forward the cloud mask image data over the forward downlink 118 to the ground station 116.

Figure 2:
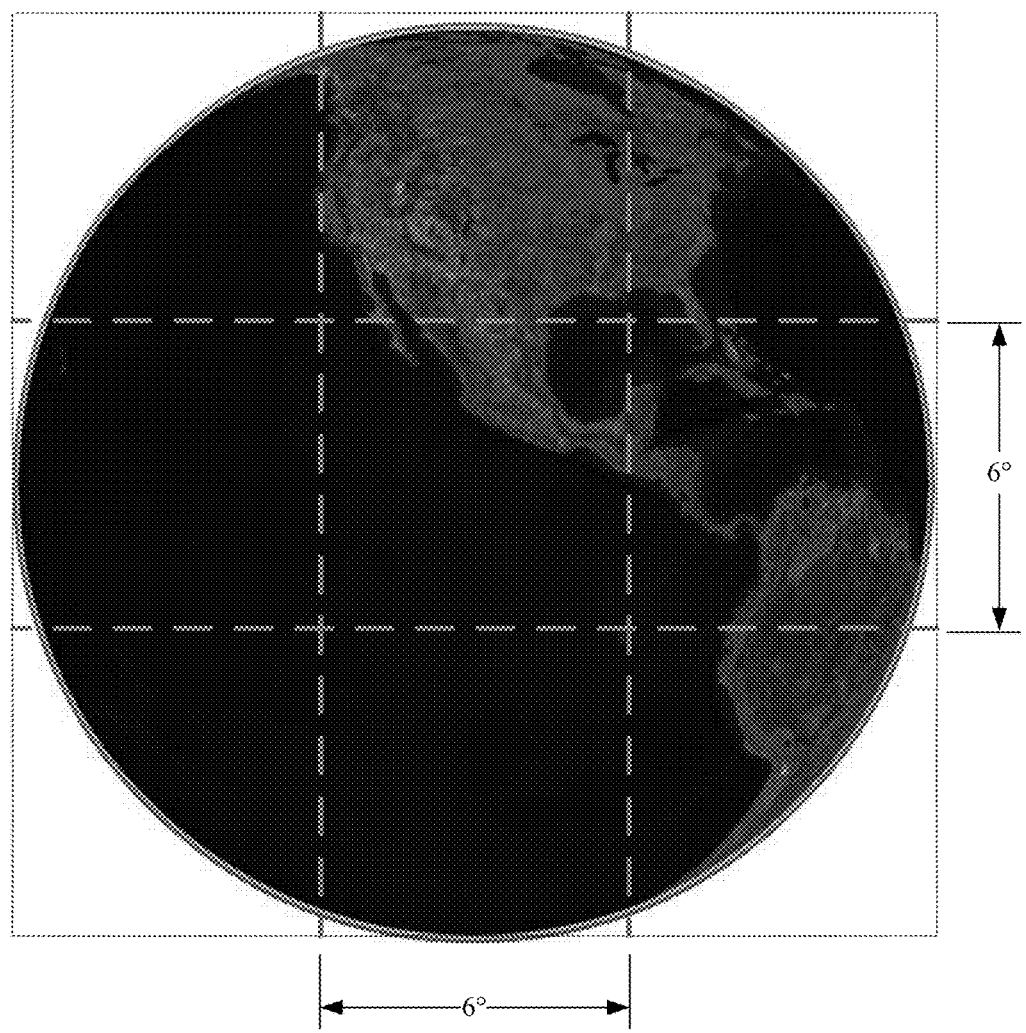
FIG. 2 illustrates an example of a field of regard optical sensor, in accordance with an implementation.

The satellite 111 may typically be over a thousand kilograms in mass and have, as noted above, a rated payload power in excess of 10 KW. As such, imaging payload 130, and associated power and RF link support for the imaging payload 130 may represent a small fraction of the mass, power and cost of the satellite 111. For example, in one implementation, a six megapixel visible light optical sensor is configured as 6 megapixel charge coupled device (CCD) camera that weighs about 1 kilogram, requires less than 35 watts DC power, and can be packaged within a volume of about eight cubic inches. Such an implementation may be expected to provide about 6°×6° degree field of regard. As illustrated in FIG. 2, such a field of regard represents about 119$^{th}$ of whole earth coverage which requires from GEO altitude, an approximately 17.4°×17.4° field of view. Whole earth coverage, for the above described sensor may be obtained by gimbaling all or a portion of the imaging payload 130 or by providing a plurality of camera heads.

In an implementation, the cloud mask image data may be transmitted to the ground station 112 using a small portion of the return downlink 115. In another implementation, the cloud mask image data may be commutated over an existing telemetry (TLM) data stream and transmitted to the ground by way of TLM downlink 113. In such an implementation, cloud mask image data may be transmitted at an approximate rate of two images per minute, as an overlay on an ordinary Ku band TLM downlink. The cloud mask image data may then be obtained by performing decommutation of the downlink on the ground and provisioned for use by one or more low earth orbit (LEO) imaging satellite systems. For example, the obtained cloud mask image data may be forwarded to or otherwise made available to one or more low earth orbit (LEO) imaging satellite systems within seconds or a few minutes of being obtained.

It will be appreciated that hosting the camera system as a secondary payload on a GEO communications or broadcast satellite allows for an affordable solution because the secondary payload represents a small incremental tax on the satellite's resources of, for example, mass, power and TLM capability. Moreover, by configuring as few as three GEO communications or broadcast satellites, located at diverse longitudes, to host a secondary imaging payload, nearly global cloud mask data coverage may be cost effectively obtained and made available to any number of low earth orbit imaging satellite systems.

Figure 3:
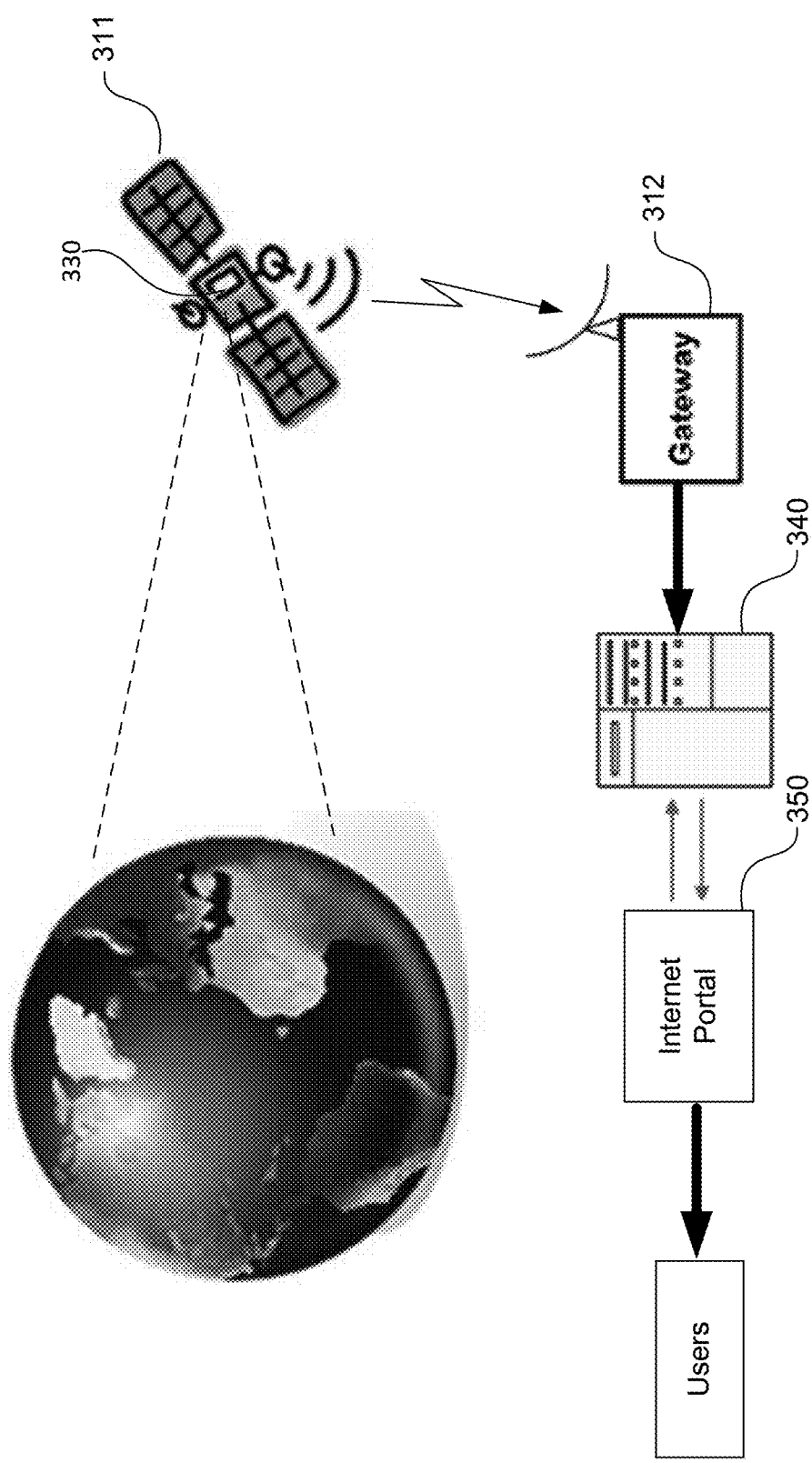
FIG. 3 illustrates a simplified diagram of a satellite system, in accordance with another implementation.

In some implementations, imagery data captured from GEO orbit may be downlinked to the ground for real time processing and made available to LEO imaging satellite operators for look ahead tasking of their assets. For example, referring to FIG. 3, an imaging payload 330 is disposed as a secondary payload on a GEO communications spacecraft 311. Image data obtained by the secondary payload may be downloaded by way of gateway 312 and forwarded to an image archive 340. The image archive 340 may be accessed, by way of Internet portal 350, for example, by any number of users. The users, typically, may be operators of LEO imaging satellites and may use the data to appropriately task their satellite assets. For example, the users may cause selected LEO imaging satellites to refrain from collecting and/or downloading image data that is obscured by clouds.

Figure 4:
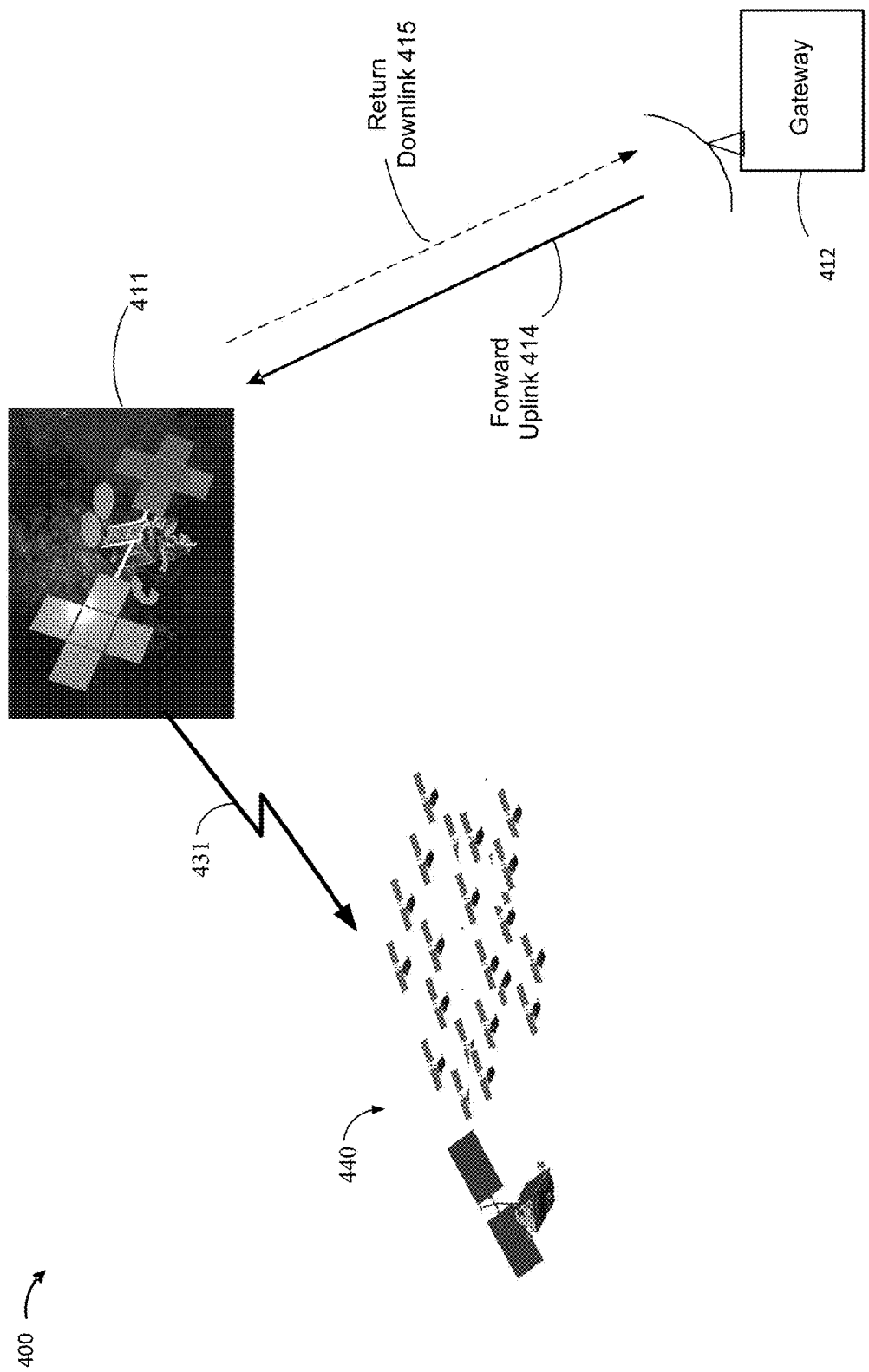
FIG. 4 illustrates a simplified diagram of a satellite system, in accordance with a yet further implementation.

In some implementations, the image data, or tasking instructions based on the imaging data, may be transmitted directly to satellites in LEO via inter satellite links, for example. In an implementation illustrated in FIG. 4, for example, a simplified diagram of a satellite system 400 includes a communications or broadcast satellite 411 located in a GEO. The satellite 411 may be communicatively coupled by a forward uplink 414 and a return downlink 115 to a gateway 412. The system may provide point to point voice and/or data communications services and/or point to multi point broadcast services, as described above, in connection with FIG. 1. The satellite 411 may be communicatively coupled with one or more satellites 440 operating in LEO by way of an intersatellite link 431. As a result, cloud mask image data may be delivered directly to the real spacecraft, and ground press processing of the cloud mask image data may be largely or entirely avoided. In some implementations, the cloud mask image data may be accompanied by tasking instructions. The tasking instructions may be generated by software on board the satellite for 411, or generated on the ground and relayed through the satellite 411 to the one or more satellites operating in LEO.

Figure 5:
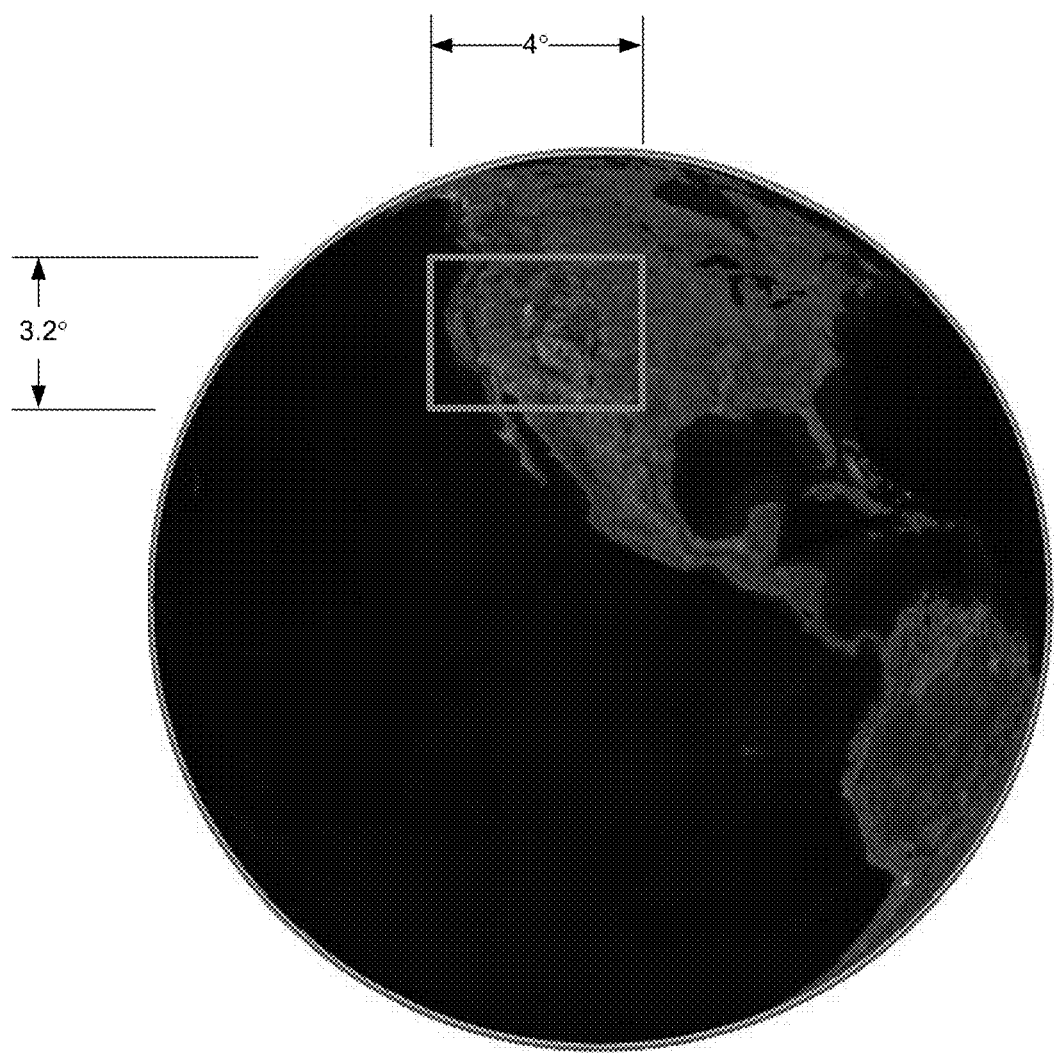
FIG. 5 illustrates an example image of Earth as viewed from a satellite in GEO.

FIG. 5 illustrates an example image of Earth as viewed from a satellite in GEO. From GEO altitude, an approximately 17.4°×17.4° field of view is required to image the entire Earth. Within that field of view, a camera may be configured to target a partial field of view (field of regard). In the illustrated example, the field of regard is 3.0°×4.2°. Camera optics and/or a gimbal mechanism may enable the field of regard to be steered toward regions of interest on the Earth's surface. In some implementations, the field of regard may be commandably adjustable in size to obtain a higher resolution image of a smaller region of interest for example.

By appropriate selection of camera optics and/or gambling arrangements a wide range of resolutions may be obtained. For example a ground sample distance (GSD) of about 2 km may be obtained using camera optics having a 23 mm aperture. It will be appreciated that larger aperture optics may provide even higher resolution. For example with a 100 mm aperture, a GSD of about 200 meters may be expected.

Figure 6:
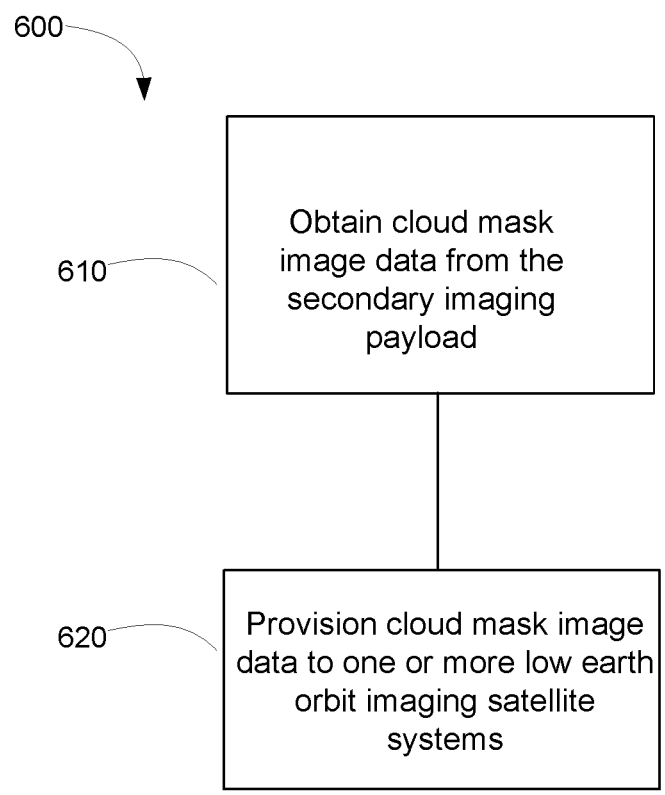
FIG. 6 illustrates a process flow diagram for provisioning cloud mask image data for use by one or more low earth orbit imaging satellite systems, according to an implementation.
Figure 7:
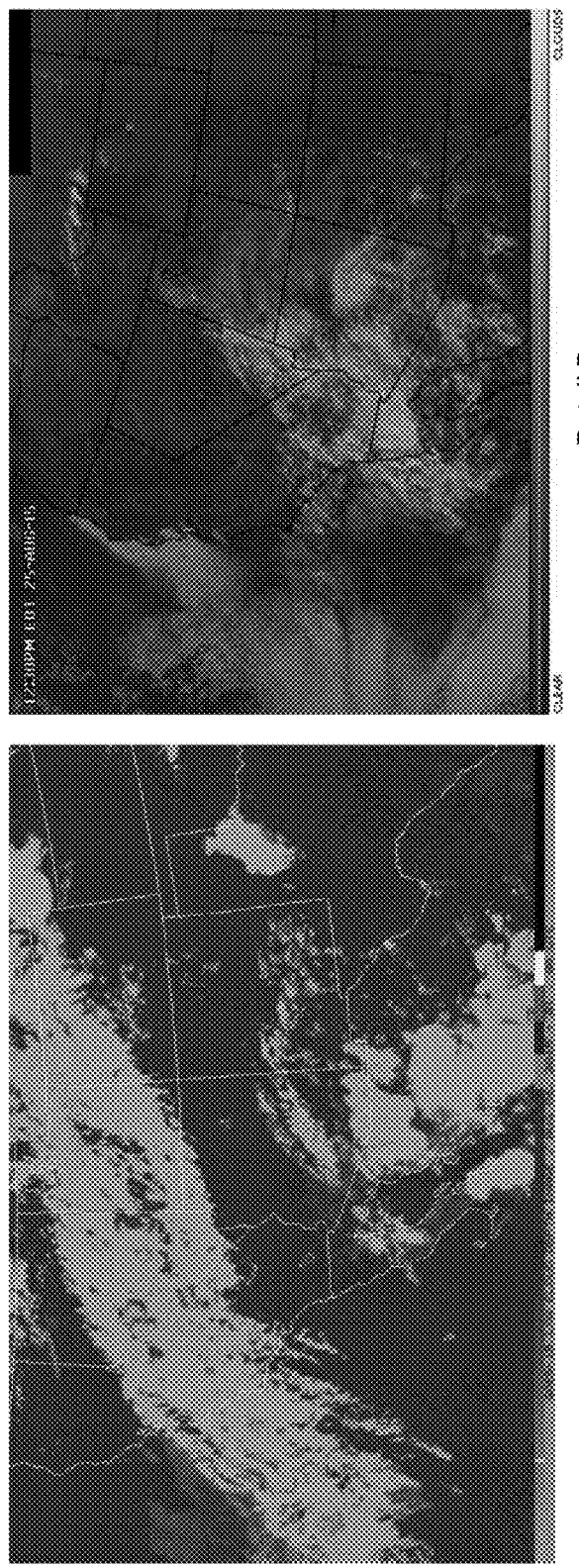
FIG. 7 illustrates a comparison of two cloud images obtained one hour apart.

FIG. 6 illustrates a process flow diagram for provisioning cloud mask image data for use by one or more low earth orbit imaging satellite systems. As described hereinabove, the cloud mask image data may be obtained by a secondary imaging payload disposed on a communications or broadcast satellite operating in a geosynchronous orbit. The method 600 may start, at block 610, with obtaining cloud mask image data from the secondary imaging payload. At block 620, the obtained cloud mask image data may be provisioned to one or more low earth orbit imaging satellite systems. In some implementations, provisioning the obtained cloud mask image data may include collecting the data on the ground and making it available to one or more operators of the one or more of LEO imaging satellite systems. Alternatively, or in addition, provisioning the obtained cloud mask image data may include transmitting the data from the communications or broadcast satellite to at least one spacecraft in the one or more LEO imaging satellite systems.

Thus, techniques for obtaining cloud mask image data from a secondary imaging payload disposed a on communications or broadcast satellite operating in geosynchronous orbit and forwarding the data to one or more LEO imaging satellite systems have been disclosed. The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A method comprising:
   Obtaining cloud mask image data from a secondary imaging payload disposed on a communications or broadcast satellite operating in a geosynchronous orbit, the cloud mask image data including real time cloud location data for look ahead tasking of assets within one or more low earth orbit (LEO) imaging satellite systems; and
   Provisioning the obtained cloud mask image data such that the obtained cloud mask image data is available in near real time to the one or more LEO imaging satellite systems;
   wherein the satellite includes a primary payload subsystem directed toward one or both of communications and broadcast services and a power subsystem configured to provide 10 KW or more of DC power to the primary payload subsystem; and provisioning the obtained cloud mask image data includes one or both of (a) collecting the data on the ground and making it available to one or more operators of the one or more LEO imaging satellite systems, and (b) transmitting the data from the communications or broadcast satellite to at least one spacecraft in the one or more LEO imaging satellite systems.

2. The method of claim 1, wherein transmitting the data from the communications or broadcast satellite to the at least one spacecraft includes using an inter-satellite link.

3. The method of claim 1, wherein provisioning the obtained cloud mask image data includes transmitting the data from the communications or broadcast satellite to a gateway.

4. The method of claim 3, wherein transmitting the data from the communications or broadcast satellite to the gateway includes overlaying the data onto an existing telemetry downlink.

5. The method of claim 1, wherein the secondary imaging payload is a steerable camera.

6. The method of claim 5, wherein the steerable camera includes a charge coupled device image sensor.

7. The method of claim 1, wherein the communications or broadcast satellite has a dry mass and a rated power, and the secondary imaging payload comprises less than 5% of the dry mass, and less than 5% of the rated power.

8. The method of claim 1, wherein the communications or broadcast satellite is disposed in a geostationary orbit.

9. A satellite configured for operation in geosynchronous orbit, the satellite comprising:
a primary payload subsystem directed toward one or both of communications and broadcast services;
a power subsystem configured to provide 10 KW or more of DC power to the primary payload subsystem; and
a secondary imaging payload configured to obtain cloud mask image data, the cloud mask image data including real time cloud location data; wherein:
the satellite is configured to forward the obtained cloud mask image data in near real time to one or more low earth orbit imaging (LEO) imaging satellite systems.

10. The satellite of claim 9, wherein the satellite is configured to forward the obtained cloud mask image data by transmitting the data to at least one spacecraft in a LEO imaging satellite system.

11. The satellite of claim 9, wherein the satellite is configured to forward the obtained cloud mask image data by transmitting the data to a gateway.

12. The satellite of claim 11, wherein transmitting the data to the gateway includes overlaying the data onto an existing telemetry downlink.

13. The satellite of claim 9, wherein the secondary imaging payload is a steerable camera.

14. The satellite of claim 13, wherein the steerable camera includes a charge coupled device image sensor.

15. The satellite of claim 9, wherein the satellite has a dry mass and a rated power, and the secondary imaging payload comprises less than 5% of the dry mass, and less than 5% of the rated power.

16. The satellite of claim 9, wherein the satellite is disposed in a geostationary orbit.

17. A system comprising:
a gateway; and
a satellite, the satellite being configured for operation in geosynchronous orbit and including
a primary payload subsystem directed toward one or both of communications and broadcast services;
a power subsystem configured to provide 10 KW or more of DC power to the primary payload subsystem; and
a secondary imaging payload configured to obtain cloud mask image data, the cloud mask image data including real time cloud location data; wherein:
the satellite is configured to forward the obtained cloud mask image data in near real time to one or more low earth orbit imaging (LEO) imaging satellite systems by transmitting the data to the gateway.

18. The system of claim 17, wherein transmitting the data to the gateway includes overlaying the data onto an existing telemetry downlink.

* * * * *